(12) United States Patent
Doi et al.

(10) Patent No.: US 12,535,109 B2
(45) Date of Patent: Jan. 27, 2026

(54) DISC BRAKE FOR VEHICLE

(71) Applicant: Hitachi Astemo, Ltd., Hitachinaka (JP)

(72) Inventors: Tomohiro Doi, Hitachinaka (JP); Shota Uehara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 414 days.

(21) Appl. No.: 18/027,570

(22) PCT Filed: Sep. 21, 2021

(86) PCT No.: PCT/JP2021/034642
§ 371 (c)(1),
(2) Date: Mar. 21, 2023

(87) PCT Pub. No.: WO2022/065319
PCT Pub. Date: Mar. 31, 2022

(65) Prior Publication Data
US 2023/0375051 A1 Nov. 23, 2023

(30) Foreign Application Priority Data
Sep. 23, 2020 (JP) .................................. 2020-158241

(51) Int. Cl.
*F16D 55/228* (2006.01)
*F16D 65/095* (2006.01)

(52) U.S. Cl.
CPC ......... *F16D 55/228* (2013.01); *F16D 65/095* (2013.01)

(58) Field of Classification Search
CPC .............................. F16D 55/228; F16D 65/095
(Continued)

(56) References Cited

U.S. PATENT DOCUMENTS

| 6,223,867 B1 * | 5/2001 | Doi ..................... F16D 65/0006 188/73.34 |
| 9,746,042 B2 * | 8/2017 | Morio ..................... F16D 65/18 |
| 2007/0080032 A1 | 4/2007 | Sano |

FOREIGN PATENT DOCUMENTS

| JP | H09-25963 A | 1/1997 |
| JP | 2007-100748 A | 4/2007 |

(Continued)

OTHER PUBLICATIONS

Extended Supplementary European Search Report dated Oct. 10, 2024, issued in counterpart Application No. 21872448.2. (8 pages).
(Continued)

*Primary Examiner* — Christopher P Schwartz
(74) *Attorney, Agent, or Firm* — WHDA, LLP (57) ABSTRACT

A disc brake for a vehicle capable of suppressing uneven abrasion of a lining of a friction pad depending on the rigidity of a caliper body and the material of the lining of the friction pad and capable of easily changing an operation feeling. In this disc brake for a vehicle, an inlet-side torque transmitting member 7 for receiving a braking torque of a friction pad 4 and an outlet-side torque transmitting member 8 are each mounted to a friction pad storage portion 3g of a caliper body 3. A first torque transmitting portion 7a of the inlet-side torque transmitting member 7 and a second torque transmitting portion 8a of the outlet-side torque transmitting member 8 are formed so that a thickness (T1) of the first torque transmitting portion 7a in the disc circumferential direction and a thickness (T2) of the second torque transmitting portion 8a in the disc circumferential direction differ from each other. The friction pad 4 is arranged so that the center of the friction pad 4 is offset from the center of the caliper body 3 in the disc circumferential direction.

6 Claims, 7 Drawing Sheets

(58) Field of Classification Search
USPC ........................ 188/73.1, 73.39, 73.46, 73.47
See application file for complete search history.

(56) References Cited

FOREIGN PATENT DOCUMENTS

| | | |
|---|---|---|
| JP | 2008-144891 A | 6/2008 |
| JP | 2008-196683 A | 8/2008 |
| JP | 2010-159820 A | 7/2010 |
| JP | 2013-104479 A | 5/2013 |

OTHER PUBLICATIONS

Decision of Refusal dated Apr. 15, 2025, issued in counterpart JP Application No. 2022-552003, with English translation. (6 pages).

* cited by examiner

DISC BRAKE FOR VEHICLE

TECHNICAL FIELD

The present invention relates to a disc brake for a vehicle, and more particularly to a disc brake for a vehicle in which friction pad storage portions that store a pair of friction pads provided on both side portions of a disc rotor are formed in action portions of a caliper body.

BACKGROUND ART

In the related art, in a disc brake for a vehicle, friction pads provided on both side portions of a disc rotor are suspended by a hanger pin, a friction pad storage portion including a disc inlet-side torque receiving surface that faces a disc inlet-side end surface of the friction pad and a disc outlet-side torque receiving surface that faces a disc outlet-side end surface of the friction pad is formed in an action portion of a caliper body, a torque transmitting member is mounted on the disc outlet-side torque receiving surface, a center of the friction pad is offset from a center of the caliper body in a disc circumferential direction, and uneven abrasion of a lining of the friction pad is prevented (for example, see PTL 1).

In general, in the disc brake for a vehicle, an operation feeling is changed by offsetting the center of the friction pad from the center of the caliper body.

CITATION LIST

Patent Literature

PTL 1: JPH09-25963A

SUMMARY OF INVENTION

Technical Problem

However, in PTL 1 described above, properties of the uneven abrasion of the friction pad differ according to rigidity of the caliper body or a material of the lining of the friction pad, and thus it is necessary to adjust an offset amount between the center of the friction pad and the center of the caliper body according to the rigidity of the caliper body or the material of the lining. At this time, not only a thickness of the torque transmitting member in the disc circumferential direction is changed, but also a position of an insertion hole through which the hanger pin is inserted or a shape of a back plate of the friction pad needs to be changed, and thus costs increase.

Accordingly, an object of the invention is to provide a disc brake for a vehicle capable of preventing uneven abrasion of a lining of a friction pad according to rigidity of a caliper body or a material of the lining of the friction pad and capable of easily changing an operation feeling.

Solution to Problem

In order to achieve the above object, the invention provides a disc brake for a vehicle. In the disc brake, a caliper body is formed by connecting, by a bridge portion extending over an outer circumference of a disc rotor, a pair of action portions each having a cylinder hole for storing a piston, and friction pad storage portions are formed in the action portions to store a pair of friction pads provided on both side portions of the disc rotor. Each friction pad storage portion includes a disc inlet-side torque receiving surface that faces a disc inlet-side end surface of the friction pad when the vehicle moves forward, and a disc outlet-side torque receiving surface that faces a disc outlet-side end surface of the friction pad when the vehicle moves forward. An inlet-side torque transmitting member configured to receive a braking torque by abutting against the disc inlet-side end surface of the friction pad is mounted on the disc inlet-side torque receiving surface. An outlet-side torque transmitting member configured to receive a braking torque by abutting against the disc outlet-side end surface of the friction pad is mounted on the disc outlet-side torque receiving surface. A thickness of the inlet-side torque transmitting member in a disc circumferential direction differs from a thickness of the outlet-side torque transmitting member in the disc circumferential direction, and a center of the friction pad is offset from a center of the caliper body in the disc circumferential direction.

The thickness of the inlet-side torque transmitting member in the disc circumferential direction may be larger than the thickness of the outlet-side torque transmitting member in the disc circumferential direction, and the center of the friction pad may be offset from the center of the caliper body to a disc outlet side.

The thickness of the outlet-side torque transmitting member in the disc circumferential direction may be larger than the thickness of the inlet-side torque transmitting member in the disc circumferential direction, and the center of the friction pad may be offset from the center of the caliper body to a disc inlet side.

It is preferable that the caliper body is formed with a plurality of cylinder holes facing the pair of action portions.

It is preferable that the cylinder hole on the disc outlet side has a diameter larger than that of the other cylinder hole.

It is preferable that each of the outlet-side torque transmitting member and the inlet-side torque transmitting member includes a pad supporting portion protruding from an end portion on an inner side in a disc radial direction toward an inner side of the caliper body and configured to support a disc radial direction inner side surface of the friction pad.

Advantageous Effects of Invention

According to the disc brake for a vehicle in the invention, the inlet-side torque transmitting member and the outlet-side torque transmitting member having different thicknesses in the disc circumferential direction are mounted on the friction pad storage portions, and thus the center of the friction pad is offset from the center of the caliper body in the disc circumferential direction, and uneven abrasion of the friction pad can be prevented. Further, an offset amount between the center of the friction pad and the center of the caliper body can be adjusted simply by changing the thicknesses of the inlet-side torque transmitting member and the outlet-side torque transmitting member in the disc circumferential direction, uneven abrasion of a lining of the friction pad can be favorably prevented according to rigidity of the caliper body or a material of the friction pad, and there would be no concern in cost increase.

An operation feeling can be changed by adjusting the offset amount between the center of the friction pad and the center of the caliper body. In addition, when abutting surfaces between the inlet-side torque transmitting member and the friction pad and between the outlet-side torque transmitting member and the friction pad are abrased due to repeating braking, the inlet-side torque transmitting member or the outlet-side torque transmitting member may be replaced, and thus durability of the caliper body can be improved.

The thickness of the inlet-side torque transmitting member in the disc circumferential direction is larger than the thickness of the outlet-side torque transmitting member in the disc circumferential direction, and the center of the friction pad is offset from the center of the caliper body to the disc outlet side. Accordingly, since the piston presses the friction pad on the disc inlet side at the time of braking, it is possible to increase a braking force at an initial stage of braking due to a servo effect while preventing the uneven abrasion of the friction pad according to the rigidity of the caliper body or the material of the lining of the friction pad, and to adjust the operation feeling such that a brake effect at the initial stage of braking is high.

The thickness of the outlet-side torque transmitting member in the disc circumferential direction is larger than the thickness of the inlet-side torque transmitting member in the disc circumferential direction, and the center of the friction pad is offset from the center of the caliper body to the disc inlet side. Accordingly, since a pressing force applied from the piston to the friction pad on the disc inlet side at the time of braking is reduced, it is possible to prevent the servo effect while preventing the uneven abrasion of the friction pad according to the rigidity of the caliper body or the material of the lining of the friction pad, and to adjust the operation feeling to gently apply the braking force from the initial stage of braking.

The plurality of cylinder holes face the pair of action portions of the caliper body. Accordingly, even in a case of a disc brake using another pot-facing caliper body, the uneven abrasion of the friction pad can be prevented according to the rigidity of the caliper body or the material of the lining of the friction pad simply by changing the thicknesses of the inlet-side torque transmitting member and the outlet-side torque transmitting member in the disc circumferential direction.

The cylinder hole on the disc outlet side has a diameter larger than that of the other cylinder hole. Accordingly, the disc inlet side of the friction pad can be prevented from being abrased earlier than the disc outlet side.

The pad supporting portions are formed integrally with the outlet-side torque transmitting member and the inlet-side torque transmitting member. Accordingly, the pad supporting portions can be easily formed, and manufacturing costs can be reduced.

DESCRIPTION OF EMBODIMENTS

FIGS. 1 to 6 are drawings showing a first embodiment of a disc brake for a vehicle according to the invention. An arrow A indicates a rotation direction of a disc rotor that rotates integrally with a wheel when the vehicle moves forward. A disc outlet side and a disc inlet side as described below are assumed when the vehicle moves forward.

A disc brake 1 for a vehicle according to the first embodiment includes a disc rotor 2 that rotates integrally with a wheel, a piston-facing caliper body 3 having a monocoque structure and mounted on a vehicle body on one side portion of the disc rotor 2, and a pair of friction pads 4 and 4 facing each other with the disc rotor 2 sandwiched therebetween between action portions 3a and 3a of the caliper body 3 provided on both side portions of the disc rotor 2.

The caliper body 3 integrally includes the pair of action portions 3a and 3a and a bridge portion 3b extending over the pair of action portions 3a and 3a on a disc outer circumferential side, and ceiling openings 3c and 3c are formed in the bridge portion 3b. In each of the action portions 3a, a small-diameter cylinder hole 3d is formed on the disc inlet side, and a large-diameter cylinder hole 3e on the disc outlet side. A small-diameter piston 5a is inserted into the small-diameter cylinder hole 3d, and a large-diameter piston 5b is inserted into the large-diameter cylinder hole 3e. Hydraulic pressure chambers 6 are defined between the cylinder hole 3d and the piston 5a and between the cylinder hole 3e and the piston 5b.

Figure 3:
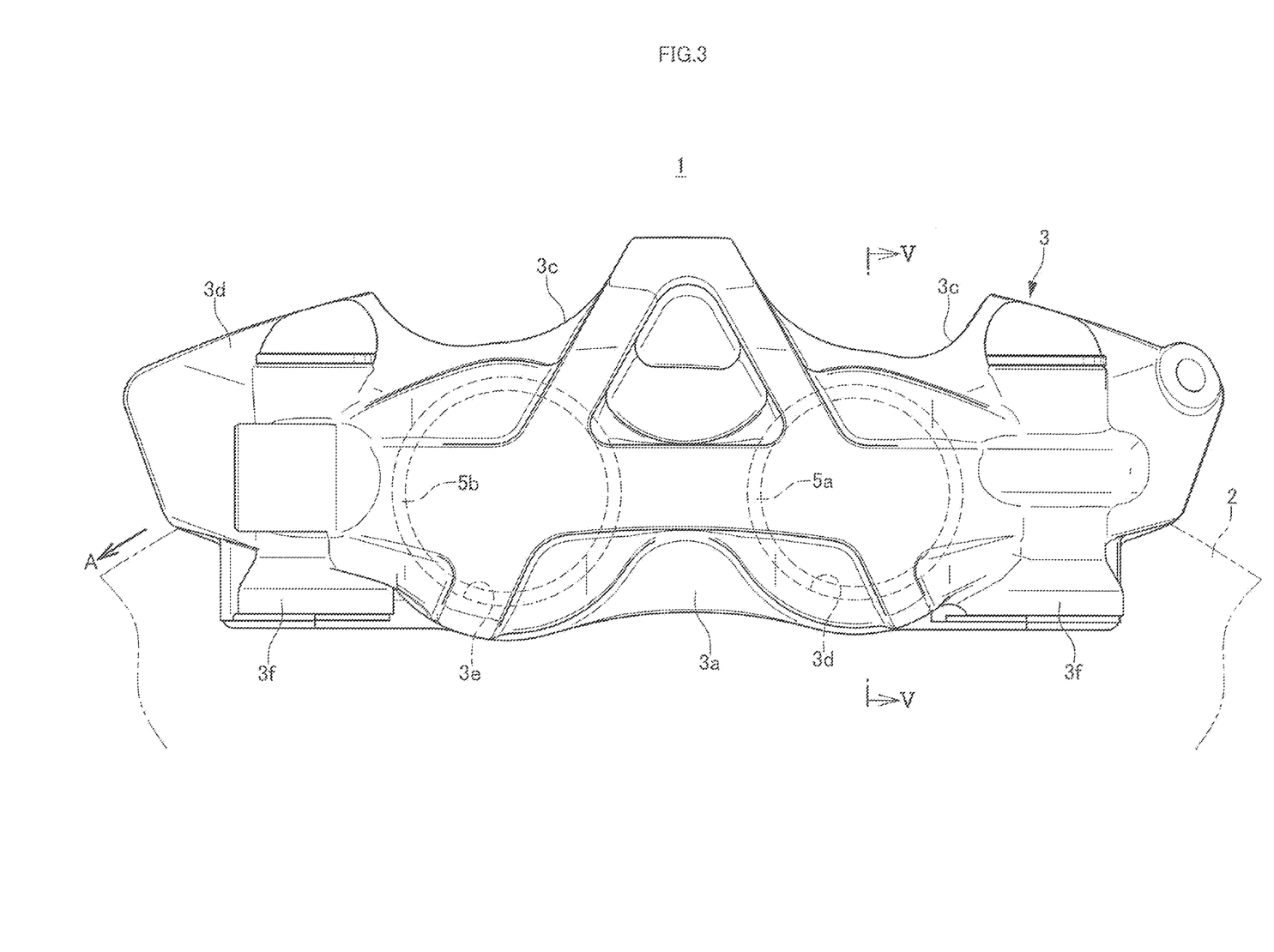
FIG. 3 is a front view of a disc brake for a vehicle according to a first embodiment of the invention.
Figure 4:
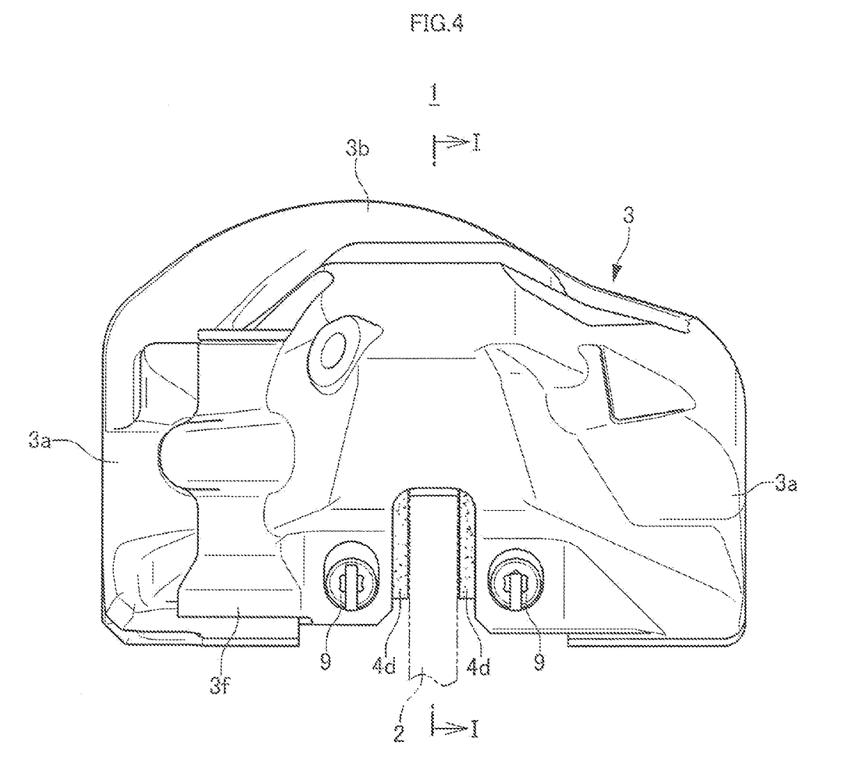
FIG. 4 is a side view of the same disc brake for a vehicle.

Mounting boss portions 3f and 3f are formed in a disc radial direction on both sides of one action portion 3a provided on an outer side of the vehicle body in a disc circumferential direction. The caliper body 3 is mounted on the vehicle body by screwing mounting bolts inserted into mounting bolt insertion holes that are formed in the mounting boss portions 3f and 3f into caliper mounting portions (none of which is shown) provided on a vehicle body side.

Figure 1:
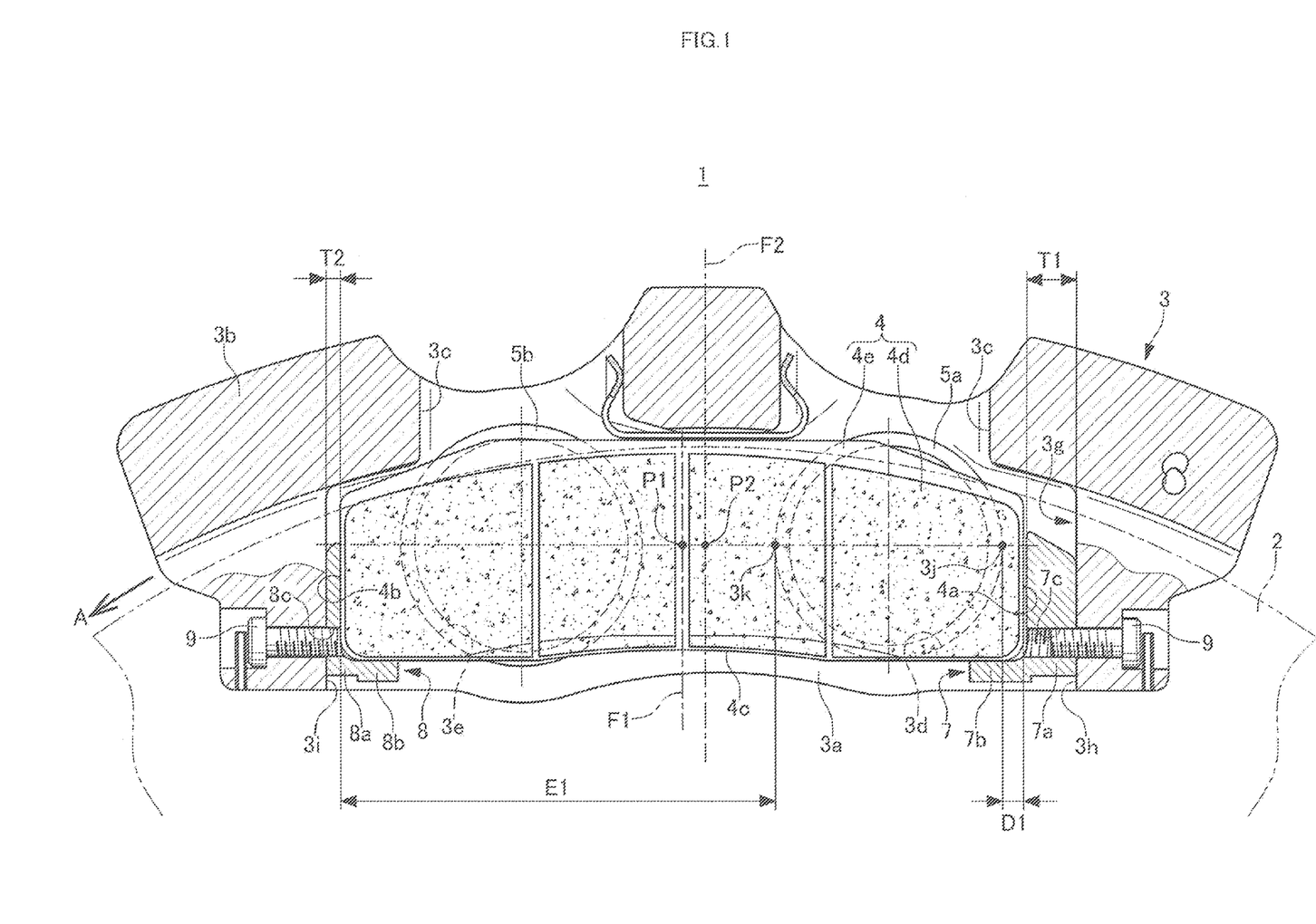
FIG. 1 is a cross-sectional view taken along a line I-I in FIG. 4.
Figure 5:
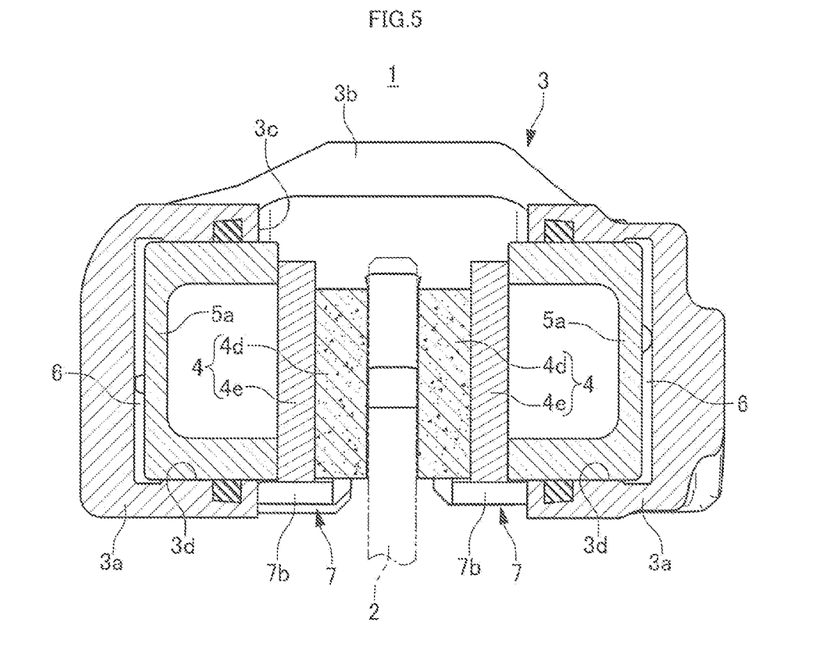
FIG. 5 is a cross-sectional view taken along a line V-V in FIG. 3.

A friction pad storage portion 3g that stores the friction pad 4 is formed in each action portion 3a. The friction pad storage portion 3g is formed on an inner side with respect to the ceiling openings 3c and 3c in the disc radial direction, and includes a disc inlet-side torque receiving surface 3h and a disc outlet-side torque receiving surface 3i. Further, an inlet-side torque transmitting member 7 that receives a braking torque by abutting against a disc inlet-side end surface 4a of the friction pad 4 is mounted on the disc inlet-side torque receiving surface 3h by a bolt 9, and an outlet-side torque transmitting member 8 that receives a braking torque by abutting against a disc outlet-side end surface 4b of the friction pad 4 is mounted on the disc outlet-side torque receiving surface 3i by the bolt 9.

Figure 6:
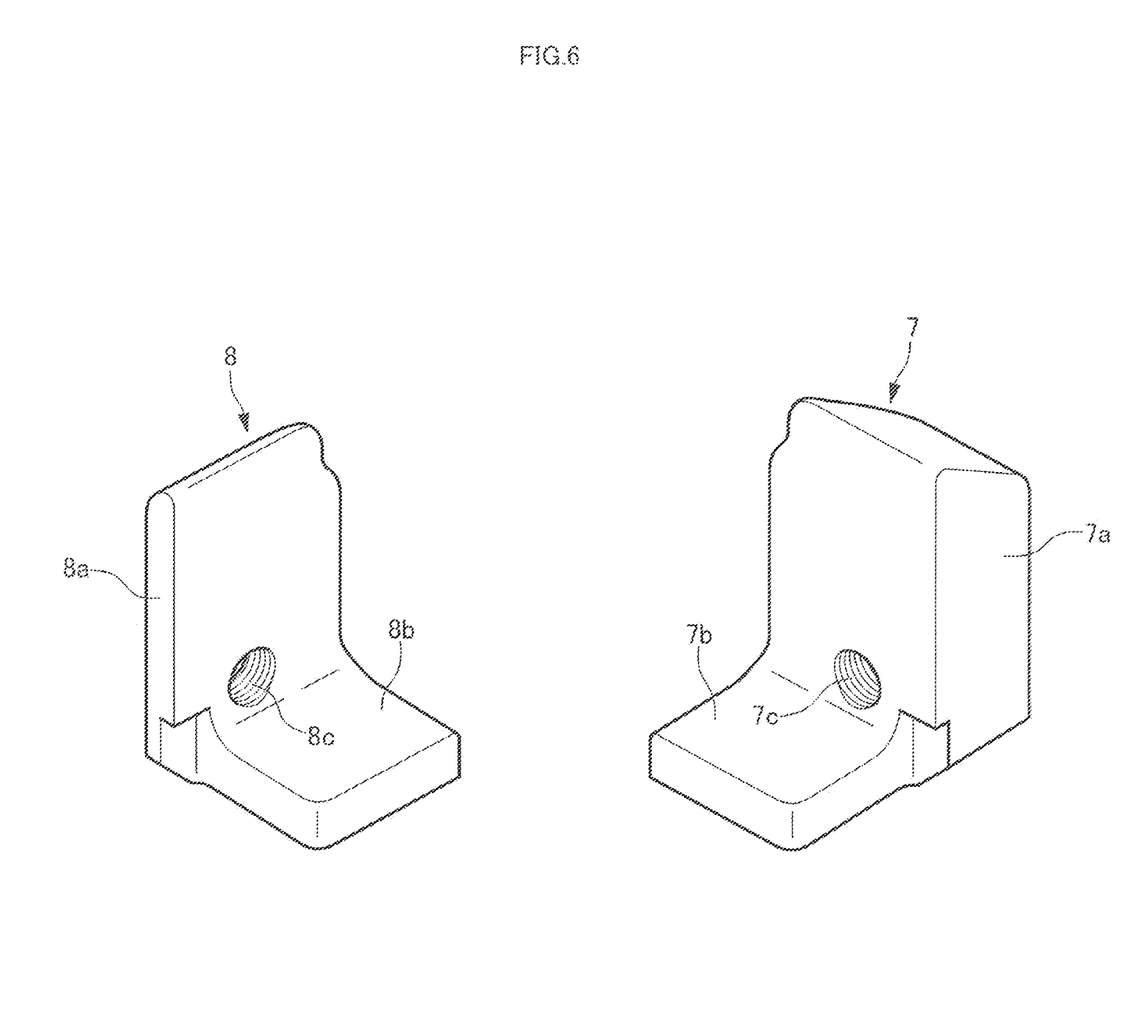
FIG. 6 is a perspective view of an outlet-side torque transmitting member and an inlet-side torque transmitting member according to the first embodiment of the invention.

The inlet-side torque transmitting member 7 includes a first torque transmitting portion 7a mounted on the disc inlet-side torque receiving surface 3h, and a first pad supporting portion 7b protruding from an end portion of the first torque transmitting portion 7a on an inner side in the disc radial direction toward an inner side of the caliper body and supporting a disc radial direction inner side surface 4c of the friction pad 4, and the first torque transmitting portion 7a is formed with a first female screw 7c to which the bolt 9 is attached. The outlet-side torque transmitting member 8 includes a second torque transmitting portion 8a mounted on the disc outlet-side torque receiving surface 3i, and a second pad supporting portion 8b protruding from an end portion of the second torque transmitting portion 8a on an inner side in the disc radial direction toward the inner side of the caliper body and supporting the disc radial direction inner side surface 4c of the friction pad 4, and the second torque transmitting portion 8a is formed with a second female screw portion 8c to which the bolt 9 is attached. Further, a thickness (T1) of the first torque transmitting portion 7a of the inlet-side torque transmitting member 7 in the disc circumferential direction is larger than a thickness (T2) of the second torque transmitting portion 8a of the outlet-side torque transmitting member 8 in the disc circumferential direction.

Each of the friction pads 4 and 4 includes a lining 4d in sliding contact with a side surface of the disc rotor 2, and a metal back plate 4e on which the lining 4d is mounted. The friction pad 4 is stored in the friction pad storage portion 3g in a state in which the disc radial direction inner side surface 4c is supported by the first pad supporting portion 7b and the second pad supporting portion 8b, the disc inlet-side end surface 4a faces the first torque transmitting portion 7a of the inlet-side torque transmitting member 7, and the disc outlet-side end surface 4b faces the second torque transmitting portion 8a of the outlet-side torque transmitting member 8. A center P1 of the friction pad 4 is offset from a center P2 of the caliper body 3 to the disc outlet side.

Figure 2:
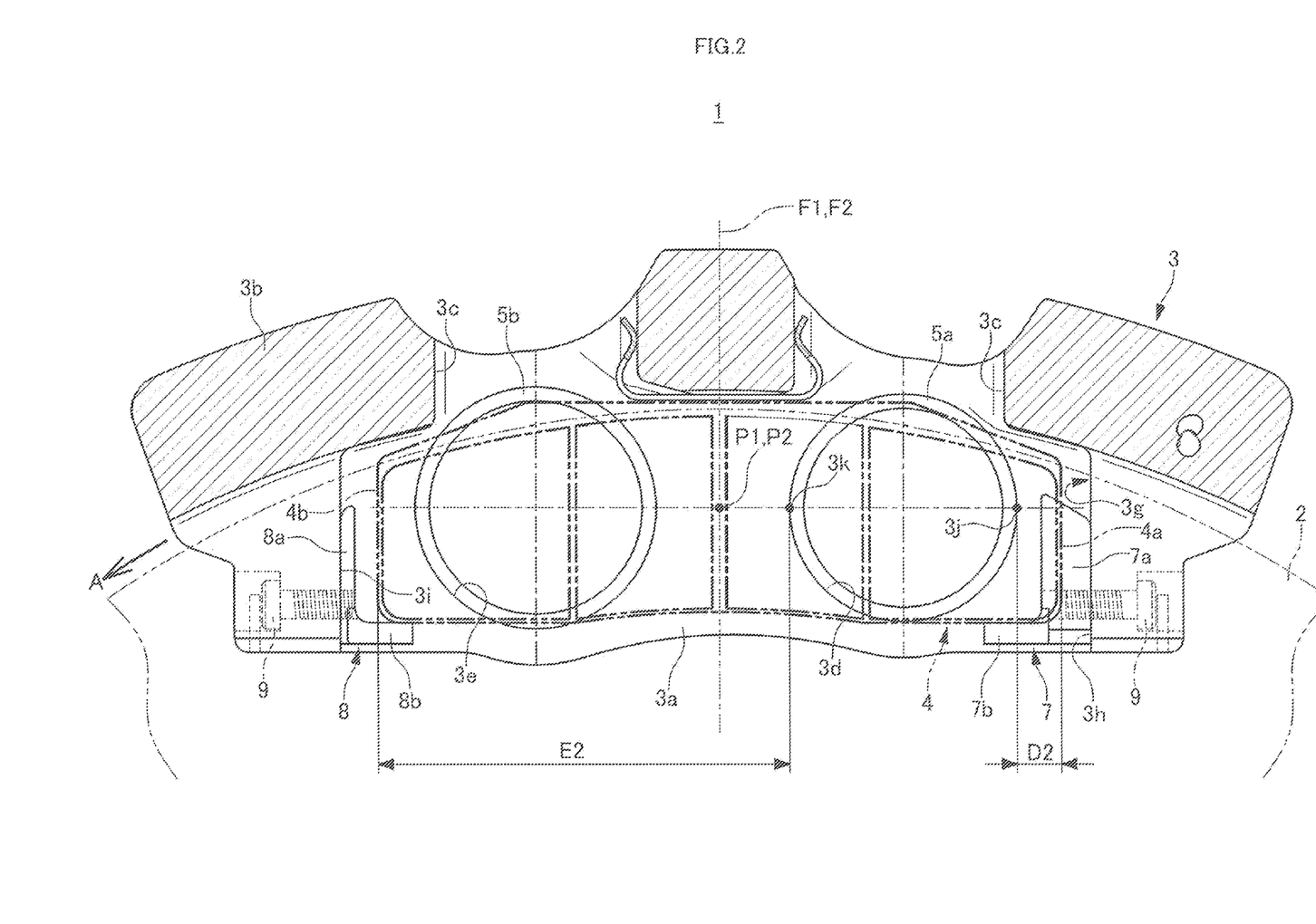
FIG. 2 is a virtual view when a friction pad is provided in a pad storage portion by aligning a center of the friction pad with a center of a caliper body.

FIG. 2 shows a virtual view of the disc brake when the friction pad 4 is provided in the friction pad storage portion 3g by aligning the center P1 of the friction pad 4 with the center P2 of the caliper body 3, that is, when the friction pad 4 is provided in the friction pad storage portion 3g by overlapping a first orthogonal plane F1 passing through the center P1 of the friction pad 4 and orthogonal to a disc axis with a second orthogonal plane F2 passing through the center P2 of the caliper body 3 and orthogonal to the disc axis. A comparison between the caliper body 3 and the friction pad 4 of the disc brake 1 according to the first embodiment will be described below. A distance (D2) shown in FIG. 2 indicates a distance between a disc inlet-side end portion 3j of the cylinder hole 3d and the disc inlet-side end surface 4a of the friction pad 4, and a distance (E2) indicates a distance between a disc outlet-side end portion 3k of the cylinder hole 3d and the disc outlet-side end surface 4b of the friction pad 4.

In the disc brake 1 according to the first embodiment, when the friction pad 4 is provided in the friction pad storage portion 3g, a distance (D1) between the disc inlet-side end portion 3j of the small-diameter cylinder hole 3d on the disc inlet side and the disc inlet-side end surface 4a of the friction pad 4 is smaller than the distance (D2). Further, a distance (E1) between the disc outlet-side end portion 3k of the cylinder hole 3d and the disc outlet-side end surface 4b of the friction pad 4 is larger than the distance (E2).

In the disc brake 1 for a vehicle formed as described above, the inlet-side torque transmitting member 7 and the outlet-side torque transmitting member 8 are mounted on the friction pad storage portion 3g. Accordingly, the center P1 of the friction pad 4 is offset from the center P2 of the caliper body 3 to the disc outlet side, and uneven abrasion of the lining 4d can be prevented according to rigidity of the caliper body 3 or a material of the friction pad 4. In addition, an offset amount between the center P1 of the friction pad 4 and the center P2 of the caliper body 3 can be adjusted using the inlet-side torque transmitting member 7 in which the thickness (T1) of the first torque transmitting portion 7a in the disc circumferential direction is changed or the outlet-side torque transmitting member 8 in which the thickness (T2) of the second torque transmitting portion 8a in the disc circumferential direction is changed, the uneven abrasion of the lining 4d of the friction pad 4 can be favorably prevented without changing a shape of the caliper body 3 or the friction pad 4, and there would be no concern in cost increase.

Further, when the first torque transmitting portion 7a, the first pad supporting portion 7b, the second torque transmitting portion 8a, or the second pad supporting portion 8b is abrased due to repeating braking, the inlet-side torque transmitting member 7 or the outlet-side torque transmitting member 8 may be replaced, and thus durability of the caliper body 3 can be improved.

Since the center P1 of the friction pad 4 is offset from the center P2 of the caliper body 3 to the disc outlet side, the small-diameter piston 5a on the disc inlet side presses the friction pad 4 on the disc inlet side at the time of braking, and the large-diameter piston 5b on the disc outlet side presses the friction pad 4 on the disc outlet side. Therefore, it is possible to increase a braking force at an initial stage of braking due to a servo effect while preventing the uneven abrasion of the lining 4d according to the rigidity of the caliper body 3 or the material of the friction pad 4, and to adjust an operation feeling such that a brake effect at the initial stage of braking is high.

Further, the first pad supporting portion 7b is integrally formed with the inlet-side torque transmitting member 7, and the second pad supporting portion 8b is integrally formed with the outlet-side torque transmitting member 8. Accordingly, the pad supporting portions can be easily formed, and manufacturing costs can be reduced.

Figure 7:
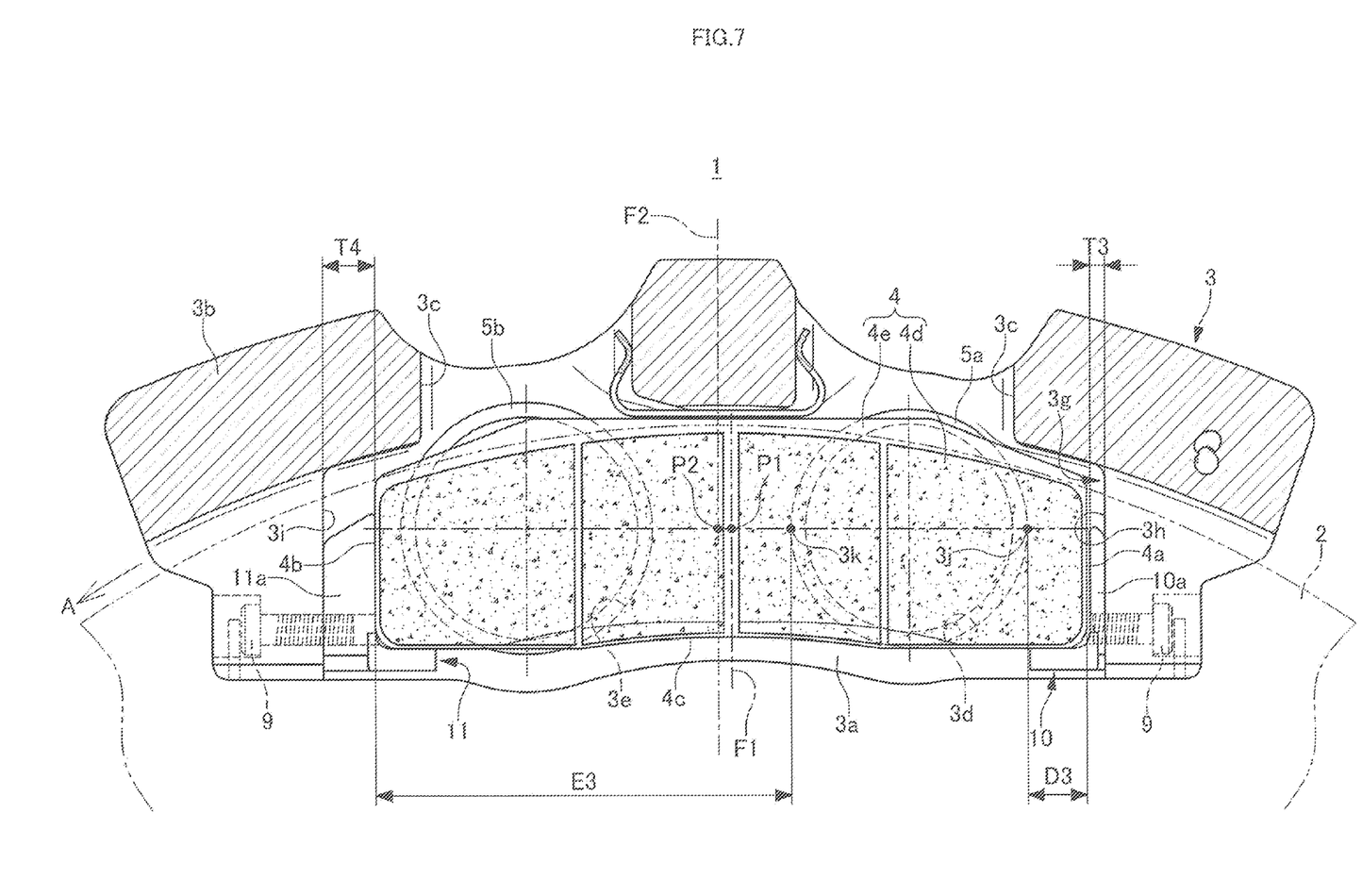
FIG. 7 is a cross-sectional view of a disc brake for a vehicle according to a second embodiment of the invention.
Figure 8:
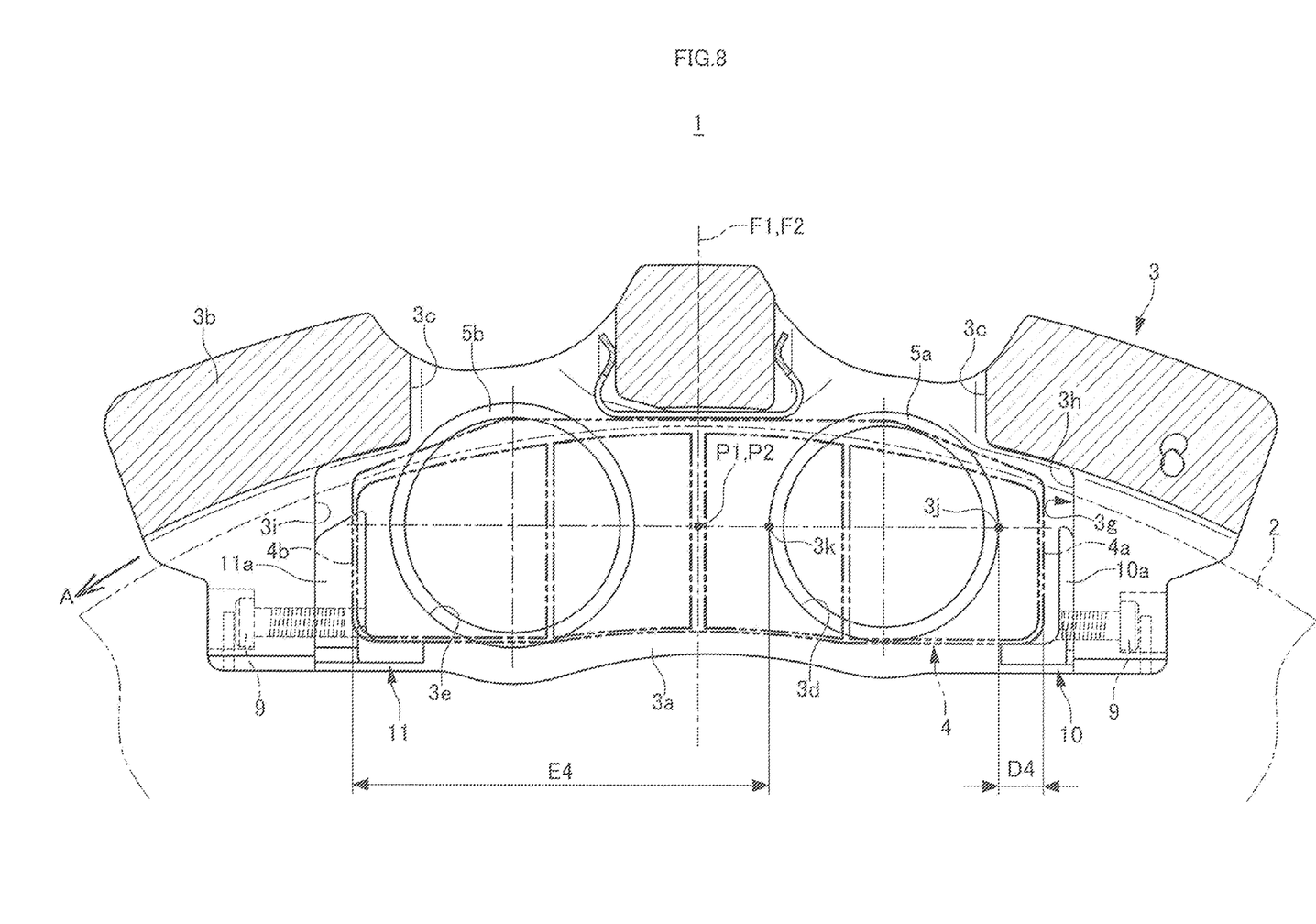
FIG. 8 is a virtual view when a friction pad is provided in a pad storage portion by aligning a center of the friction pad with a center of a caliper body.

Since FIGS. 7 and 8 show a second embodiment of the invention, the same elements as those according to the first embodiment are denoted by the same reference signs, and the detailed description thereof will be omitted.

In the second embodiment, a thickness (T3) of a first torque transmitting portion 10a of an inlet-side torque transmitting member 10 in a disc circumferential direction is larger than a thickness (T4) of a second torque transmitting portion 11a of an outlet-side torque transmitting member 11 in the disc circumferential direction.

Accordingly, in a state in which the friction pad 4 is stored in the friction pad storage portion 3g, the center P1 of the friction pad 4 is offset from the center P2 of the caliper body 3 to a disc inlet side.

FIG. 8 shows a virtual view of the disc brake when the friction pad 4 is provided in the friction pad storage portion 3g by aligning the center P1 of the friction pad 4 with the center P2 of the caliper body 3, that is, when the friction pad 4 is provided in the friction pad storage portion 3g by overlapping the first orthogonal plane F1 with the second orthogonal plane F2. A comparison between the caliper body 3 and the friction pad 4 of the disc brake 1 according to the second embodiment will be described below. A distance (D4) shown in FIG. 8 indicates a distance between the disc inlet-side end portion 3j of the cylinder hole 3d and the disc inlet-side end surface 4a of the friction pad 4, and a distance (E4) indicates a distance between the disc outlet-side end portion 3k of the cylinder hole 3d and the disc outlet-side end surface 4b of the friction pad 4.

In the disc brake 1 according to the second embodiment, when the friction pad 4 is provided in the friction pad storage portion 3g, a distance (D3) between the disc inlet-side end portion 3j of the small-diameter cylinder hole 3d on the disc inlet side and the disc inlet-side end surface 4a of the friction pad 4 is larger than the distance (D4). Further, a distance (E3) between the disc outlet-side end portion 3k of the cylinder hole 3d and the disc outlet-side end surface 4b of the friction pad 4 is smaller than the distance (E4).

The second embodiment is formed as described above. Accordingly, a pressing force applied from the piston 5a to the friction pad 4 on the disc inlet side at the time of braking is reduced, and the large-diameter piston 5b on a disc outlet side presses the friction pad 4 on the disc outlet side. Therefore, it is possible to prevent a servo effect while preventing uneven abrasion of the lining 4d according to rigidity of the caliper body 3 or a material of the friction pad 4, and to adjust an operation feeling to gently apply a braking force from an initial stage of braking.

The disc brake for a vehicle according to the invention is not limited to the disc brake for a vehicle using the piston-facing caliper body having a monocoque structure as in the above-described embodiments, and can also be applied to a disc brake for a vehicle using a split-type piston-facing caliper body. The number of cylinder holes formed in the action portion of the caliper body can be freely set. Further, when the thickness of the first torque transmitting portion in the disc circumferential direction and the thickness of the second torque transmitting portion in the disc circumferential direction are changed, it is also possible to replace the inlet-side torque transmitting member used in the related art with the outlet-side torque transmitting member and to replace the outlet-side torque transmitting member with the inlet-side torque transmitting member.

REFERENCE SIGNS LIST

1: disc brake for vehicle
2: disc rotor
3: caliper body
3a: action portion
3b: bridge portion
3c: ceiling opening
3d, 3e: cylinder hole
3f: mounting boss portion
3g: friction pad storage portion
3h: disc inlet-side torque receiving surface
3i: disc outlet-side torque receiving surface
3j: disc inlet-side end portion
3k: disc outlet-side end portion
4: friction pad
4a: disc inlet-side end surface
4b: disc outlet-side end surface
4c: disc radial direction inner side surface
4d: lining
4e: back plate
5a, 5b: piston
6: hydraulic pressure chamber
7: inlet-side torque transmitting member
7a: first torque transmitting portion
7b: first pad supporting portion
7c: first female screw portion
8: outlet-side torque transmitting member
8a: second torque transmitting portion
8b: second pad supporting portion
8c: second female screw portion
9: bolt
10: inlet-side torque transmitting member
10a: first torque transmitting portion
11: outlet-side torque transmitting member
11a: second torque transmitting portion

The invention claimed is:

1. A disc brake for a vehicle in which a caliper body is formed by connecting, by a bridge portion extending over an outer circumference of a disc rotor, a pair of action portions each having a cylinder hole for storing a piston, and in which friction pad storage portions are formed in the action portions to store a pair of friction pads provided on both side portions of the disc rotor, wherein each friction pad storage portion includes a disc inlet-side torque receiving surface that faces a disc inlet-side end surface of the friction pad when the vehicle moves forward, and a disc outlet-side torque receiving surface that faces a disc outlet-side end surface of the friction pad when the vehicle moves forward, an inlet-side torque transmitting member configured to receive a braking torque by abutting against the disc inlet-side end surface of the friction pad is mounted on the disc inlet-side torque receiving surface, an outlet-side torque transmitting member configured to receive a braking torque by abutting against the disc outlet-side end surface of the friction pad is mounted on the disc outlet-side torque receiving surface, and a thickness of the inlet-side torque transmitting member in a disc circumferential direction differs from a thickness of the outlet-side torque transmitting member in the disc circumferential direction, and a center of the friction pad is offset from a center of the caliper body in the disc circumferential direction, wherein the friction pad has a side surface which defines a bottom surface of the friction pad which is located at an inner end of the friction pad with respect to a radial direction of the disc rotor, each of the outlet-side torque transmitting member and the inlet-side torque transmitting member includes a pad supporting portion protruding from an end portion of the outlet-side torque transmitting member and the inlet-side torque transmitting member, respectively, the end portion being located at an inner end of the outlet-side torque transmitting member and the inlet-side torque transmitting member with respect to the radial direction of the disc rotor, the pad supporting portion protruding toward an inner side of the caliper body in the disc circumferential direction along the side surface of the friction pad to support the side surface of the friction pad.

2. The disc brake for a vehicle according to claim 1, wherein the thickness of the inlet-side torque transmitting member in the disc circumferential direction is larger than the thickness of the outlet-side torque transmitting member in the disc circumferential direction, and the center of the friction pad is offset from the center of the caliper body to a disc outlet side.

3. The disc brake for a vehicle according to claim 1, wherein the thickness of the outlet-side torque transmitting member in the disc circumferential direction is larger than the thickness of the inlet-side torque transmitting member in the disc circumferential direction, and the center of the friction pad is offset from the center of the caliper body to a disc inlet side.

4. The disc brake for a vehicle according to claim 1, wherein the caliper body is formed with a plurality of cylinder holes facing the pair of action portions.

5. The disc brake for a vehicle according to claim 4, wherein the cylinder hole on the disc outlet side has a diameter larger than that of the other cylinder hole.

6. A disc brake for a vehicle in which a caliper body is formed by connecting, by a bridge portion extending over an outer circumference of a disc rotor, a pair of action portions each having a cylinder hole for storing a piston, and in which friction pad storage portions are formed in the action portions to store a pair of friction pads provided on both side portions of the disc rotor, wherein
- each friction pad storage portion includes a disc inlet-side torque receiving surface that faces a disc inlet-side end surface of the friction pad when the vehicle moves forward, and a disc outlet-side torque receiving surface that faces a disc outlet-side end surface of the friction pad when the vehicle moves forward,
- an inlet-side torque transmitting member configured to receive a braking torque by abutting against the disc inlet-side end surface of the friction pad is mounted on the disc inlet-side torque receiving surface,
- an outlet-side torque transmitting member configured to receive a braking torque by abutting against the disc outlet-side end surface of the friction pad is mounted on the disc outlet-side torque receiving surface, and
- a thickness of the inlet-side torque transmitting member in a disc circumferential direction differs from a thickness of the outlet-side torque transmitting member in the disc circumferential direction, and a center of the friction pad is offset from a center of the caliper body in the disc circumferential direction, wherein
- each of the outlet-side torque transmitting member and the inlet-side torque transmitting member includes a pad supporting portion protruding from an end portion on an inner side in a disc radial direction toward an inner side of the caliper body and configured to support a disc radial direction inner side surface of the friction pad,
- the inlet-side torque transmitting member includes a first torque transmitting portion mounted on the disc inlet-side torque receiving surface,
- the outlet-side torque transmitting member includes a second torque transmitting portion mounted on the disc outlet-side torque receiving surface,
- the first torque transmitting portion and the second torque transmitting portion are formed with attachment holes which bolts are attached,
- each of the attachment holes is formed with female screw portion,
- the inlet-side torque transmitting member and the outlet-side torque transmitting member are mounted by inserting bolts into the attachment holes from outside towards inside of the caliper body.

* * * * *